June 8, 1954

M. JARAMILLO 2,680,351

TIME CONTROLLED IRRIGATION GATE

Filed Jan. 14, 1952

Melaquias Jaramillo
INVENTOR.

BY *Clarence A. O'Brien*
*and Harvey B. Jacobson*
Attorneys

June 8, 1954     M. JARAMILLO     2,680,351
TIME CONTROLLED IRRIGATION GATE
Filed Jan. 14, 1952     2 Sheets-Sheet 2

Melaquias Jaramillo
INVENTOR.

UNITED STATES PATENT OFFICE 2,680,351

TIME CONTROLLED IRRIGATION GATE

Melaquias Jaramillo, Wendell, Idaho

Application January 14, 1952, Serial No. 266,311

6 Claims. (Cl. 61—28)

This invention relates generally to an irrigation gate, and more specifically to a time controlled irrigation gate for use at a fork in an irrigation channel.

The primary object of this invention is to provide a gate for an irrigation channel which may be disposed at a fork therein for controlling the flow of water to the branches thereof.

Another object of this invention is to provide an improved irrigation gate having openings for the flow of water therethrough, and gate elements for closing said openings.

Another object of this invention is to provide an improved gate for an irrigation channel which is provided with means along its edges and bottom for sealing same with respect to an irrigation channel.

Another object of this invention is to provide an improved irrigation gate for use at a fork in an irrigation channel, said gate being provided with two sections at an angle to each other, and an opening in each of said sections for the flow of water therethrough.

A further object of this invention is to provide an improved irrigation gate having two sections hingedly secured to each other for closing two forks of an irrigation channel, each of said sections having water passageways therethrough, gate elements for closing said passageways, and said gate elements being connected to each other whereby when one of said gate elements is opened the other of said gate elements is closed, and time controlled means for operating said gate elements.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1:
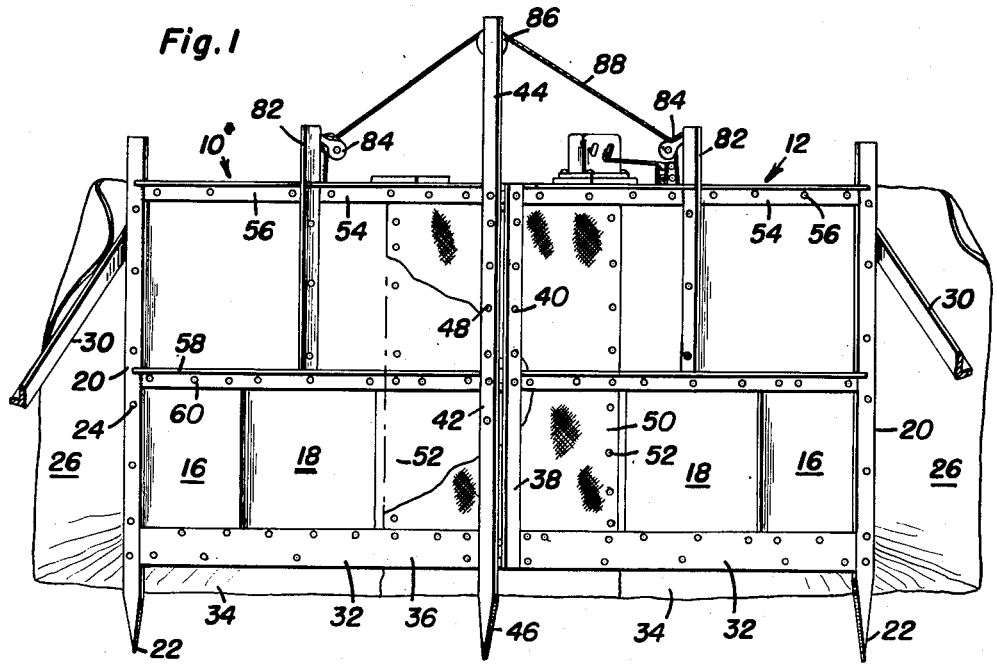
Figure 1 is a rear elevational view of the irrigation gate, which forms the subject of this invention, said gate being illustrated as being applied to a fork in an irrigation channel, parts being broken away and shown in section in order to more clearly illustrate the hinge connection between the gate sections.
Figure 2:
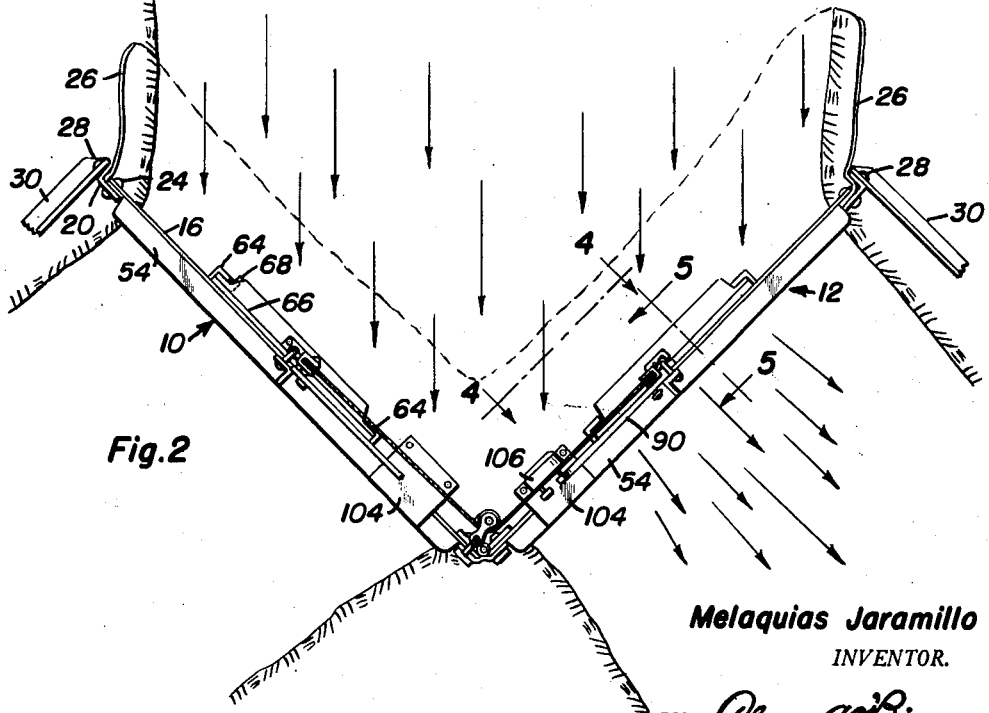
Figure 2 is a top plan view of the irrigation gate of Figure 1 and showing the manner in which the flow of water through an irrigation channel is controlled by the gate.
Figure 4:
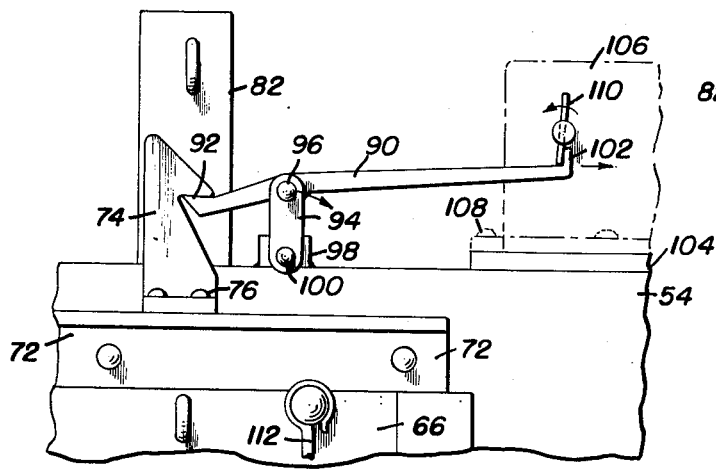
Figure 5:
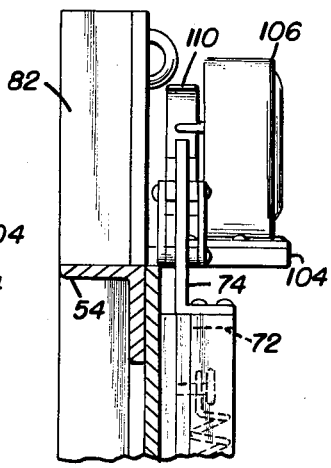

Figure 4 is an enlarged fragmentary front elevational view of one of the gate sections and taken substantially upon the plane indicated by the line 4—4 of Figure 2 and showing the means for latching one of the gate elements in its open position and means for releasing said latch means; and Figure 5 is an enlarged partial transverse vertical sectional view through one of the gate sections taken substantially upon the plane indicated by the section line 5—5 of Figure 2 and showing the construction of the means for releasably latching one of the gate elements in an open position.

Similar characters of reference designate similar or identical elements and portions throughout the specification and throughout the different views of the drawings.

Referring now to the drawings in detail, this invention includes an irrigation gate having identical first and second gate sections 10 and 12, said gate sections being hingedly secured together along opposed side edges by a plurality of hinges 14.

Each of the gate sections is formed of a sheet 16 having a rectangular opening 18 in its lower central portion. Secured to the outer side edge of the sheet 16 is a combination frame and support member 20 of angle cross section. The member 20 extends above and below the sheet 16 and has a pointed lower end 22. The angle member 20 is secured to the sheet 16 by a plurality of rivets 24 which also clamp an elongated strip of canvas 26 between the angle member 20 and the plate 16. Hingedly secured to one of the flanges of the angle member 20 by a pivot pin 28 is an angle brace member 30.

Also secured to the rear of the plate 16, but at the bottom edge thereof is a reinforcing plate element 32. Disposed between the plate element 32 and the sheet 16 is a bottom elongated strip of canvas 34. The plate 32 and the canvas strip 34 is secured to the sheet 16 by a plurality of rivets 36.

Extending vertically along the rear edge of the sheet 16 of the gate section 12 is an angle frame member 38 secured to the sheet 16 by a plurality of rivets 40. Extending vertically along the inner edge of the sheet 16 of the gate section 10 is a combined frame member and support 42 of angle cross section. The member 42 has an elongated upper end 44 and a pointed lower end 46. The angle member 42 is secured to the rear edge of the sheet 16 by a plurality of rivets 48 passing through one of its flanges and the sheet 16. Extending between and beyond the frame members 38 and 42 is a sheet of canvas 50 whose intermediate portion is clamped to the sheet 16 by the frame members 38 and 42. The side edges of the canvas 50 are clamped to the sheet 16 by a plurality of rivets 52. The lower edge of the canvas 50 is clamped to the sheet 16 by the lower plate 32, and the upper edge of the canvas is clamped against the rear of the sheet 16 by a transversely extending top angle frame member 54 which is secured to the upper edge of each of the sheets 16 by a plurality of rivets 56. Extending transversely of the sheet 16 and intermediate its height is an angle brace member 58 having a portion overlying the canvas 50 and secured to the sheet 16 by a plurality of rivets 60. The edge of one of the flanges of the angle member 58 being in alignment with the upper edge of the opening 18.

Figure 3:
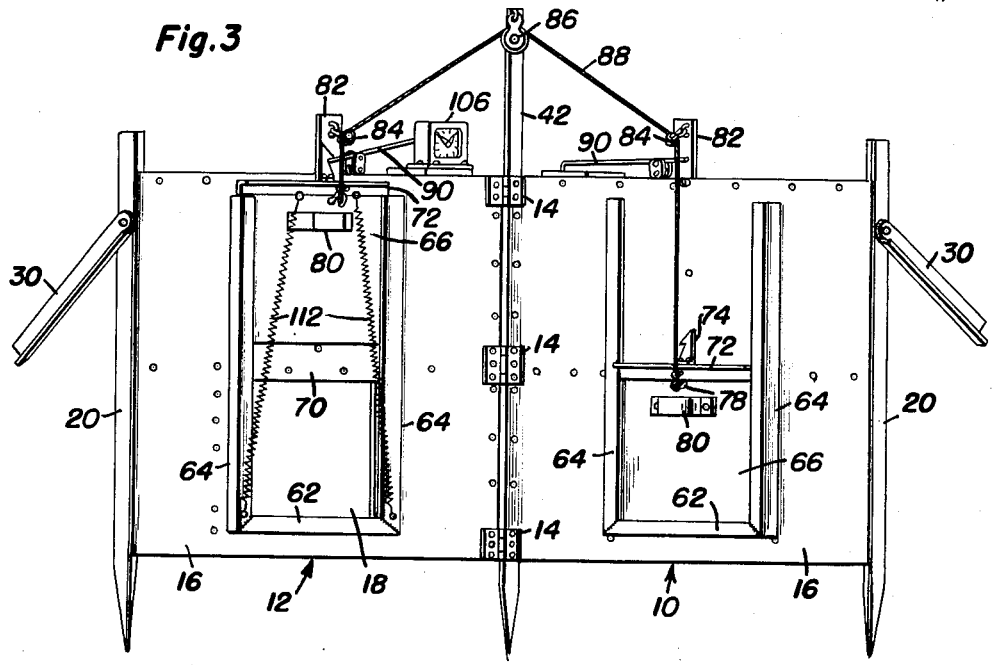
Figure 3 is a front elevational view of the irrigation gate of Figure 1 and showing the arrangement of the openings in the gate sections, and the means for opening and closing the same, the canvas sealing strips being omitted.

Looking at the front of the irrigation gate as illustrated in Figure 3, it will be seen that the opening 18 in the sheet 16 has an angle member 62 on its bottom side and elongated angles 64 on its vertical sides. The angle members 64 extend upwardly beyond the top of the opening 18 and form guideways for a gate element 66 which is slidably mounted therebetween.

Referring now to Figure 2 in detail, it will be seen that the angle members 62 and 64 are welded to the sheet 16 along the edge of one flange, with said flange being vertical to said sheet. The gate element 66 is in the form of a flat plate and has angle members 68 secured to the side edges thereof. One flange of each angle member 68 underlies a flange of an angle member 64 while the other flange thereof engages the edge of said overlying flange so that the gate element 66 is received between the sheet 16 and the angle element 64 in guided relation thereto.

The bottom edge of the gate element 66 is provided with a flap strip portion 70 which engages the bottom angle member 62 in sealing relation when the gate element 66 is in its closed position. Secured to the upper edge of the gate element 66 is an angle member 72 to which a latching hook element 74 is secured by a plurality of rivets 76. Also secured to the gate element 66 adjacent its upper edge is a hook bolt 78. Further secured to the gate element 66 adjacent its upper edge is a lifting handle 80.

Extending upwardly from the transverse brace 58 at the center of the gate section and secured to the rear of the sheet 16 is an angle support member 82. The angle support member 82 extends upwardly beyond the top of the sheet and has pivotally secured thereto a pulley 84. A pulley 86 is also pivotally secured to the upper end of the support 44. A flexible member 88 is secured to the hooks 78 on the gate element 66 of the gate sections 10 and 12 and pass over the pulleys 84 and 86. The length of the flexible member 88 is such that when one of the gate elements 66 is closed the other gate element is in its open position.

Referring now to Figure 4 in particular, it will be seen that either gate element 66 may be locked in an open position by engaging a lever arm 90 under the shoulder 92 of the hook portion 74. The lever arm 90 is pivotally connected intermediate its ends to a pair of parallel link members 94 by a pivot pin 96. The link members 94 are disposed on adjacent sides of a block 98 carried by the top frame member 54. The link members 94 are secured to the block 98 by a pivot pin 100. The end of the lever arm 90 oppositely in engagement with the hook portion 74 is provided with an upturned flange 102. Secured to the upper frame member 54 is a support plate 104. Detachably mounted on the support plate 104 is a conventional alarm clock 106 which is secured to the supporting plate 104 by conventional fasteners 108. The alarm clock 106 is located with respect to the lever arm 90 in such a manner that the alarm winding key 110 engages the flange portion 102 so that when the alarm of the clock 106 is set off, that the alarm key 110 moves the flange 102 to the right as viewed in Figure 4. Movement of the flange 102 to the right also moves the main portion 90 of the lever arm to the right and thereby releasing the hook portion 74 whereby its associated gate element 66 is no longer restrained against moving to a closing position.

It will be noted that only one of the gate sections are provided with an alarm clock, although each of the gate sections are provided with latching means and a support plate for mounting the alarm clock thereon. Since the alarm merely unlatches the gate element, it is obvious that some means must be provided for moving the gate element into a closed position. Also, since the irrigation gate, which is the subject of this invention, is designed to be disposed at a fork of an irrigation channel, one of the openings 18 must remain opened at all times in order to prevent the water in the irrigation channels to be backed up and therefore overflow their banks. As illustrated in the drawings, the alarm clock 106 is mounted on the gate section 12, and the gate element 66 is in its open position.

It is the purpose of this invention that the water be allowed to flow down the irrigation channel associated with the irrigation gate section 12 for a definite length of time, said time being set on the alarm clock 106. At the end of the predetermined time, the alarm of the alarm clock 106 is set off and the alarm winding key 110 moves the lever 90 to the right and releases the gate element 66 of the gate section 12. Extending between the upper edge of the gate element 66 and the lower ends of the side guide element 64 is a pair of tension springs 112. It will be readily seen that when the gate element 66 of the gate section 12 is released, the gate element is moved to a position closing the associated opening 18 by the tension springs 112. The downward movement of the gate element of the gate section 12 results in the upward movement of the gate element of the gate section 10 due to the connection between the two gate elements by the flexible member 88. If it is desired that the opening 18 in the gate section 10 remain open for a predetermined period of time, and then closed and the opening 18 in the gate 12 be opened, the tension springs 112 and the alarm 106 is connected to the gate element 66 of the gate section 10.

Referring now to Figure 2 in particular, it will be seen that the irrigation gate, which is the subject of this invention, is mounted at a fork in the main irrigation channel with the pointed ends of the support members 20 and 44 firmly embedded in the banks defining the irrigation channel, and the irrigation gate placed against overturning by the bases 30, when the irrigation is mounted across the irrigation channel, the sealing canvas strips 26 engage the sides of the channel banks and the bottom canvas sealing strips 34 engage the bed of the irrigation channel to render the irrigation gate watertight. The canvas strip 50 also prevents passage of water between the gate sections 10 and 12 through the hinge joint.

It will be noted that the gate sections 10 and 12, by being hingedly secured together, are adapted to be disposed at any angle to each other so as to be usable at forks in an irrigation channel where the angle between the forks varies.

Furthermore, the hinge connection between the gate sections 10 and 12 permit the irrigation gate to be folded to a size no bigger than a single gate section.

The operation of this gate will be understood from a description of the mechanical details thereof, taken in connection with the above recited objects and the drawings. Further description would appear to be unnecessary.

Minor modifications of the gate, bearing in mind the details from the embodiment of the gate illustrated and described here, may be resorted to without departure from the spirit and the scope of this invention, as defined in the appended claims.

Having described the invention, what is claimed as new is:

1. An irrigation gate for use at a fork in an irrigation ditch comprising first and second rigid gate sections, said gate sections being hingedly secured together, means carried by said gate sections for rigidly mounting said gate sections with respect to an irrigation ditch, said gate sections having flexible means along their sides and bottoms for sealing said gate sections with respect to irrigation ditches and to each other, said means for sealing said gates being in the form of canvas strips secured to said gate sections into water-tight relation thereto.

2. An irrigation gate for use at a fork in an irrigation ditch comprising first and second rigid gate sections, said gate sections being hingedly secured together, means carried by said gate sections for rigidly mounting said gate sections with respect to an irrigation ditch, openings in said gate sections, gate elements for closing said openings, said gate sections having flexible means along their sides and bottoms for sealing said gate sections with respect to irrigation ditches, and other flexible means covering said hinge to seal said gate sections relative to each other.

3. An irrigation gate for use at a fork in an irrigation ditch comprising first and second gate sections, said gate sections being hingedly secured together, means for rigidly mounting said gate sections with respect to an irrigation ditch, openings in said gate sections, gate elements for closing said openings, operating means interconnecting the gate elements of said gate sections whereby movement of one gate element in one direction results in the movement of the other of the gate elements in an opposite direction so that flow through said irrigation ditch may remain constant.

4. An irrigation gate for use at a fork in an irrigation ditch comprising first and second gate sections, said gate sections being hingedly secured together, means for rigidly mounting said gate sections with respect to an irrigation ditch, discharge openings in said gate sections, guideways adjacent said openings, gate elements slidably mounted in said guideways for closing said discharge openings, operating means interconnecting the gate elements of said sections whereby the movement of one gate element in one direction results in the movement of the other gate element in an opposite direction and only one gate may be completely open at a time, means locking the gate element of said first gate section in an open position, means urging said gate element of the first gate section to a closed position.

5. The combination of claim 4, wherein said first gate section is provided with means for releasing said locking means.

6. An irrigation gate for use at a fork in an irrigation ditch comprising first and second gate sections, said gate sections being hingedly secured together, means for rigidly mounting said gate sections with respect to an irrigation ditch, discharge openings in said gate sections, guideways adjacent said openings, gate elements slidably mounted in said guideways for closing said discharge openings, operative means interconnecting the gate elements of said sections whereby the movement of one gate element in one direction results in the movement of the gate elements in an opposite direction and only one gate completely open at a time, latch means normally retaining the gate element of said first gate section in an open position, spring means urging the gate element of said first gate section to a closed position, said spring means being of sufficient strength to effect raising of the gate element of the second gate section to an open position, time controlled actuation means connected to said latch means for moving said latch means to an ineffective position.

References Cited in the file of this patent

UNITED STATES PATENTS

| Number | Name | Date |
|---|---|---|
| Re. 13,622 | Linkletter | Sept. 30, 1913 |
| 1,080,944 | Baker | Dec. 9, 1913 |
| 1,237,107 | Shaffer | Aug. 14, 1917 |
| 1,404,325 | Schaefer | Jan. 24, 1922 |